US005252398A

United States Patent [19]

Ohtani et al.

[11] Patent Number: 5,252,398

[45] Date of Patent: Oct. 12, 1993

[54] POLYOLEFINIC RESIN-COATED CARRIER WITH IRREGULAR SURFACE

[75] Inventors: Junji Ohtani, Kobe; Yoshihisa Terasaka, Settsu; Junji Machida, Toyonaka; Satoshi Asahi; Hiroshi Hayashi, both of Chiba; Kouichi Matono, Ichihara, all of Japan

[73] Assignees: Minolta Camera Kabushiki Kaisha, Osaka; Idemitsu Kosan Company Limited, Tokyo, both of Japan

[21] Appl. No.: 639,540

[22] Filed: Jan. 10, 1991

[30] Foreign Application Priority Data

Jan. 10, 1990 [JP] Japan .................................... 2-3139

[51] Int. Cl.[5] ........................ B32B 27/14; G03G 9/00

[52] U.S. Cl. ................................... 428/403; 428/407; 430/108

[58] Field of Search ................ 428/403, 407; 430/108

[56] References Cited

U.S. PATENT DOCUMENTS

| | | | |
|---|---|---|---|
| 4,126,454 | 11/1978 | Jones | 428/407 |
| 4,233,387 | 11/1980 | Mammino et al. | 430/108 |
| 4,264,697 | 4/1981 | Perez et al. | 430/108 |
| 4,391,893 | 4/1983 | Hendriks | 428/407 |
| 4,564,647 | 1/1986 | Hayashi et al. | 523/211 |
| 4,810,611 | 3/1989 | Ziolo et al. | 430/108 |
| 4,912,005 | 3/1990 | Goodman et al. | 430/108 |

FOREIGN PATENT DOCUMENTS

| | | |
|---|---|---|
| 52-154639 | 12/1977 | Japan . |
| 54-35735 | 3/1979 | Japan . |

OTHER PUBLICATIONS

*IBM Technical Disclosure Bulletin* vol. 26 No. 9 Feb. 1984.

Patent Abstract of Japan, vol. 10, No. 86 (P-443) [2143], Apr. 4, 1986; JP-A-60 221767.

*Primary Examiner*—Paul J. Thibodeau
*Assistant Examiner*—D. S. Nakarani
*Attorney, Agent, or Firm*—Burns, Doane, Swecker & Mathis

[57] ABSTRACT

The present invention provides a carrier of a two component developer for developing electrostatic latent images comprising;

a carrier core material comprising a magnetic particle, an irregular surface-coating layer formed by coating the carrier core material with polyolefinic resin, followed by heat treatment.

22 Claims, 1 Drawing Sheet

POLYOLEFINIC RESIN-COATED CARRIER WITH IRREGULAR SURFACE

BACKGROUND OF THE INVENTION

The present invention relates to a carrier used in a two-component developing method, in particular a carrier coated with polyolefinic resins.

A two-component developing method, in which insulating nonmagnetic toner particles are mixed with carrier particles to be frictionally charged and these particles are carried and brought into contact with electrostatic latent images to develop electrostatic latent images, has been known as an electrostatic latent image-developing method.

The carrier particles used in such the two-component developing method have been usually coated with suitable materials on account of reasons such as the prevention of toners from forming films on surfaces of carrier particles, the formation of a surface having uniform properties, the prevention of surface oxidation, the prevention of reduced resistance to humidity, the prolongation of useful life time of developers, the protection of a photosensitive member from damages or abrasion by carriers, the control of chargeable polarity and the control of a charging quantity.

Polyolefinic resins have been known as such a coating material (for example Japanese Patent Laid-Open No. Sho 52-154639, Japanese Patent Laid-Open No. Sho 54-35735 and the like).

Japanese Patent Laid-Open No. Sho 52-154639 discloses that polypropylene resins and the like are heated to be molten in suitable solvents and the resulting molten resins are spray-coated to carrier core materials to obtain carriers particles of which surfaces are coated with polypropylene resins.

Japanese Patent Laid-Open No. Sho 54-35735 discloses that coating material powders are stuck to surfaces of carrier particles and heated at melting temperature of the coating material or more to be fixed, whereby coated carriers are obtained.

However, the carrier particles, of which surfaces are coated with polyolefinic resins as above described, have shown disadvantages in that the adhesion of coating layers to carrier particles is poor and a durability is inferior. For example, if the copying process is repeated, the coating layers are separated. In addition, the above described methods have shown a disadvantage in that, for example, the control of layer-thickness is not easy.

SUMMARY OF THE INVENTION

It is an object of the present invention to provide a polyolefinic resin-coated carrier showing no deteriorated image quality even after repetition of copying processes and superior in durability and spent resistance.

Another object of the present invention is to provide a polyolefinic resin-coated carrier excellent in density of copied images.

DETAILED DESCRIPTION OF THE INVENTION

The present invention provides a carrier which is superior in electrostatic characteristic, spent resistance, charge stability and environmental resistance, effective for formation of copied images of good quality, excellent in developing properties and capable of keeping those effects even after a long-time continuous usage.

The present invention is achieved by heat-treatment of carrier particles coated irregularly with a polyolefinic-resin layer.

The carrier particles of the present invention comprise at least core materials and irregular coating layers of polyolefinic resin.

The carrier particles according to the present invention are coated irregularly with polyolefinic resin, which is formed in close relation to a production method described below and characterized in its irregular form. Hereinafter, polyolefins are represented by polyethylene in the specification, and the carrier particles coated with the polyethylenic resin layer thereon are described.

The polyethylene-coated layer is formed by polymerizing ethylene on a carrier core material which is treated in advance with a highly active catalyst ingredient containing titanium and/or zirconium and soluble to hydrocarbon solvents in the presence of organic aluminum compounds. Fine particles having a charge controlling function and electrically conductive fine particles may be added at the formation of the polyethylenic resin-coating layer. For example, the method disclosed in U.S. Pat. No. 4,564,647 and in Japanese Patent Laid-Open No. Sho 60-106808 and Laid-Open No. Sho 60-106809 are suitable. The publication is herein cited as a part of the specification of the present invention. Other known methods may be applied to the present invention when the coating layer is directly formed on a carrier core material and the shape factor described later is satisfied.

Figure 2:
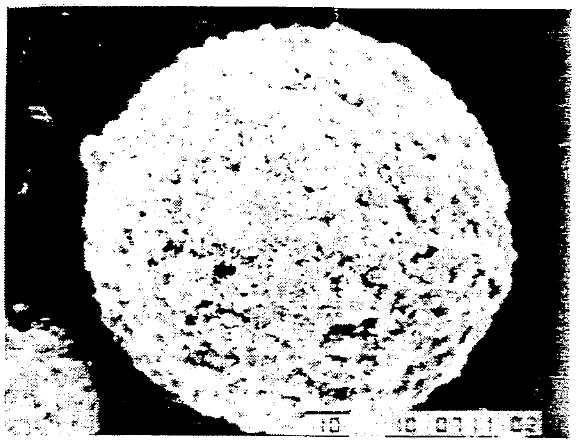
FIG. 2 shows a photograph showing a constitution of carrier particle coated with polyethylene-resin layer before heat treatment.

First of all, a carrier is prepared according to the production method described above so that the surface thereof may be irregular. A photograph ($\times 1000$) of the carrier obtained in Production Example 4 of Carrier, which is taken by means of a reflecting electron microscope, is shown in FIG. 2. FIG. 2 shows that the carrier surface is irregular.

As the polyethylenic resin layer as a surface-coating layer is formed by polymerizing ethylene directly on the surface of the carrier core material, the strength and the durability of the obtained layer are improved. In particular, when a weight average molecular weight of polyethylene is $5.0\times10^3$ to $5.0\times10^5$, preferably $1.0\times10^4$ to $4.5\times10^5$, still more preferably $5.0\times10^4$ to $4.0\times10^5$, the polyethylenic resin layer superior in strength and adhesion to carrier core material can be obtained.

If the weight average molecular weight is less than $5\times10^3$, the coating layer is fragile. If the weight average molecular weight is more than $5\times10^5$, the adhesivity of coating layer to the surface of core material becomes poor, and the durability of carrier also becomes poor.

When the irregularity of the surface is represented by the shape factor S represented by the following formula [I]:

$$S=\{(\text{outside circumference})^2/\text{area}\}\times\{1/(4\pi)\}\times 100 \quad [I]$$

wherein the outside circumference is a mean value of outside circumferences of projected images of the carrier particles and the area is a mean value of projected areas of the carrier particles, its value S is 130 to 200. The value S represents a degree of irregularity of the surface of particles. The greater the degree of irregularity of the surface, the further the value S is above 100 it shows.

The shape factor S can be measured, for example, by an image analyzer (Louzex 5,000 manufactured by Japan Regulator K.K.) but it has been observed that in general the measurement of the shape factor is independent upon a kind of image analyzers, so that the image analyzer used for the measurement of the shape factor S is not limited by the above described kind of image analyzer.

The specific surface area $S_0(m^2/g)$ of the carrier is 0.35–0.90 $m^2/g$, preferably 0.40–0.80 $m^2/g$. The bulk specific gravity $h_0(g/cm^3)$ is 1.70–2.00 $g/cm^3$, preferably 1.85–1.97 $g/cm^3$.

The carriers having irregular surface as above mentioned are excellent in electrostatic properties, spent resistance, charge stability, environmental resistance and durability. However, the content of the carrier per volume becomes low because of the surface irregularities and there appears a deterioration in developing properties, such as density of copied images and the like. In order to overcome the defect as above mentioned, the carriers having the irregularities on the surface thereof are subjected to a heat-treatment in the present invention.

It is preferable that the heat-treatment is carried out so that the specific surface area of carriers $S_1(m^2/g)$ and the bulk specific gravity h $(g/cm^3)$ may satisfy the relationships below after the heat treatment;

$$0.4\ S_0 \leqq S_1 \leqq 0.9\ S_0$$

$$1.1\ h_0 \leqq h \leqq 1.3\ h_0$$

wherein $S_0$ is the specific surface area before the heat-treatment; $h_0$ is the bulk specific gravity before the heat-treatment.

If the specific surface area $S_1$ is larger than 0.9 $S_0$ or the bulk specific gravity is lower than 1.1 $h_0$, the effects brought about the heat-treatment are not obtained and the developing properties become poor. If the specific surface area $S_1$ is smaller than 0.4 $S_0$ or the bulk specific gravity is higher than 1.3 $h_0$, the carriers are heat-treated excessively to bring about the increase of charge amount and the decrease of density of copied images.

More definitely, the carriers have the specific surface area $S_1$ $(m^2/g)$ of 0.16–0.81, preferably 0.16–0.72 and the bulk specific gravity h $(g/cm^3)$ of 1.87–2.60, preferably 2.03–2.56 after heat treatment.

The heat-treating method is not particularly limited so far as adequate heat and friction can be given to the carriers. For example, the carriers may be treated (1) in hot air current, (2) in heat transfer medium or (3) in rotary electric oven. In general, the heat-treating temperature is 50°–135° C., preferably 70°–130° C. and the heat-treating time is 1 minute to 6 hours.

The heat-treating may be under vacuum. In the case of using solvents at the polymerizing ethylene, the heat-treating may be carried out with removing the solvents.

With respect to the carrier core material, which is one of elements of the carrier of the present invention, the one having a mean particle size of at least 20 μm in view of the prevention of the adherence (scattering) of the carriers to a supporter of an electrostatic latent image and at most 100 μm in view of the prevention of deterioration of image quality, such as the prevention of generation of carrier lines, is used. Concretely speaking, materials known as electrophotographic two-component carriers, for example metals such as ferrite, magnetite, iron, nickel, cobalt and the like, alloys or mixtures of metals above mentioned with metals such as zinc, antimony, aluminum, lead, tin, bismus, beryllium, manganese, selenium, tungsten, zirconium, vanadium and the like, metal oxides such as iron oxides, titanium oxides, magnesium oxides and the like, nitrides, such as chrome nitrides, vanadium nitrides and the like, and carbides such as silicon carbides, tungsten carbides and the like, ferromagnetic ferrites, and mixtures thereof, can be used.

The core material of carrier is coated by polyethylenic resin so that 70% or more, preferably 90% or more still more preferably 95% or more of surface area of the cores may be coated. If the coating ratio is lower than 70%, characteristics of the carrier core material itself (unstabilized environmental resistance, reduction of electric resistance and unstabilized charging) strongly appear, so that the advantages of the coating with resins can not be obtained.

A content of carrier core material based on the carrier (hereinafter referred to as filling ratio by weight percent) is set at about 90 wt % or more, preferably 95 wt % or more. The filling ratio shows indirectly a layer-thickness of carrier coated with resin. If the filling ratio is lower than 90 wt %, the coating layer becomes so thick that, for example, the coating layer is separated, the charge amount being increased, the durability and the charging stability being not satisfactory. In view of the image quality, the fine line reproducibility is inferior, and the image concentration is reduced when the carries are used as a developer.

The layer-thickness of polyethylenic resins can be indirectly expressed also by a true specific gravity. The true specific gravity of the carriers according to the present invention is greatly influenced by a kind of carrier core material but it is set at about 3.5 to 7.5, preferably about 4.0 to 6.0, still more preferably about 4.0 to 5.5, so far as the carrier core material is used. If the specific gravity of the carriers is outside of said range, problems similar to those incidental to the carriers, which are not coated at said suitable content, occur.

An electric resistance of the polyethylenic resin-coated carriers with irregularities according to the present invention is set at about $1\times10^6$ to $1\times10^{14}$ ohm.cm, preferably about $10^8$ to $10^{13}$ ohm.cm, still more preferably about $10^9$ to $10^{12}$ ohm.cm. If the electric resistance is lower than $1\times10^6$ ohm.cm, the carriers are developed to deteriorate the image quality. In addition, if the electric resistance exceeds $1\times10^{14}$ ohm.cm, toners are electrically charged excessively so that the appropriate image concentration can not be obtained. It can be also thought that the electric resistance indirectly expresses said coating ratio with polyethylenic resins and the filling ratio of carrier core materials.

Additives, such as fine particles having a charge controlling function or electrically conductive fine particles, may be added to a carrier coated by polyethylene layer according to the present invention.

Concretely speaking, said fine particles having a charge controlling function include metal oxides, such as $CrO_2$, $Fe_2O_3$, $Fe_3O_4$, $IrO_2$, $MnO_2$, $MoO_2$, $NbO_2$, $PtO_2$, $TiO_2$, $Ti_2O_3$, $Ti_3O_5$, $WO_2$, $V_2O_3$, $Al_2O_3$, MgO, $SiO_2$, $ZrO_2$ and BeO, dyestuffs such as Nigrosine Base and Spilon Black TRH and the like.

Said electrically conductive fine particles include carbon blacks, such as carbon black, acetylene black and the like, carbides, such as SiC, TiC, MoC, ZrC and the like, nitrides, such as BN, NbN, TiN, ZrN and the like, magnetic powders, such as ferrite, magnetite and the like.

The addition of metal oxides, metal fluorides and metal nitrides is effective for the further enhancement of the chargeability. Such the effect seems to be brought about by a synergism of the charging effects of the respective ingredients and the toners resulting from a contact of a complicated boundary surface formed with such the compounds, polyethylene and the core material with the toners.

The addition of carbon black is effective for the enhancement of the development and the obtainment of an image having a high image concentration and a clear contrast. It seems that the addition of the electrically conductive fine particles, such as carbon black, leads to a moderate reduction of electric resistance of the carriers and the well-balanced leak and accumulation of electric charge.

One of characteristics of the conventional binder type carriers consists in the superior reproducibilities of halftone and tone gradient. With respect to the coated carriers according to the present invention, the carriers superior in reproducibility of tone gradient are obtained by adding magnetic powders to the polyethylenic resin-coating layer. It seems that a surface composition similar to that of the binder type carriers is obtained by adding the magnetic powders to the polyethylene-coated layer, whereby the chargeability and specific gravity approach those of the binder type carriers.

The addition of borides and metal carbides is effective for electrification-build up properties.

The size of the above described additives, the additional quantity of the additives and the like are not specially limited so far as various kinds of characteristic of the carriers according to the present invention, such as, coating ratio, electric resistance and the like described in the specification of the present invention, are satisfied. But, in relation to a method of producing carriers according to the present invention, which will be mentioned later, the size of the fine particles may be allowed to such a degree that, for example, they are uniformly dispersed in dehydrated hexane to be turned into a slurry without cohering. Concretely speaking, a mean particle diameter may be 2 to 0.01 μm, preferably 1 to 0.01 μm.

Also the quantity of the above described additives can not be generally limited. But, 0.1 to 60 wt %, preferably 1.0 to 40 wt %, based on polyethylenic resins is suitable.

In particular, when the filling ratio is adjusted to 90–97 wt % according to the present invention, it is preferable that the additives, such as the fine particles having a charge controlling function, the electrically conductive particles or the like are added into the polyethylenic resin layer.

In the case where the filling ratio of carriers is small, i.e. about 90 wt % or less, namely when a coating layer is comparatively thick, a problem occurs. The reproducibility is reduced when the continuous copying of fine lines is conducted by the use of such the carriers. Such the problem, however, can be solved by adding the above described additives.

According to the present invention, other olefinic resins, for example polypropylene, can be also used so far as the coating layer formed on the surface of the carriers meets the same properties as those of the above described polyethylenic resin-coating layer on the surface of the carriers, i.e. irregular structure, specific surface area, bulk specific gravity, coating ratio, filling ratio and electric resistance.

The carriers according to the present invention are mixed with the known toners to be used as a two-component developer.

PRODUCTION EXAMPLE 1 OF CARRIER

(1) Preparation of Titanium-Containing Catalyst Ingredient

N-heptane, which had been dehydrated at room temperature, of 200 ml and magnesium stearate, which had been dehydrated at 120° C. under vacuum (2 mmHg), of 15 g (25 mmol) were put in a flask having the capacity of 500 ml purged with argon to be turned into a slurry. Titanium tetrachloride of 0.44 g (2.3 mmol) was added drop by drop to the resulting slurry with stirring and then the resulting mixture was heated and subjected to a reaction for one hour with refluxing. A viscous and transparent solution of a titanium-containing catalyst ingredient was obtained.

(2) Evaluation of the Activity of the Titanium-Containing Catalyst Ingredient Dehydrated hexane of 400 ml, triethyl aluminum of 0.8 mmol, diethyl aluminum chloride of 0.8 mmol and the titanium-containing catalyst ingredient, which was obtained in the above described (1), of 0.004 mmol as titanium atoms were put in an autoclave having the capacity of 1 l purged with argon and heated to 90° C. In this time, a pressure within a system amounted to 1.5 $kg/cm^2G$. Then, hydrogen was supplied to increase the pressure to 5.5 $kg/cm^2G$ and ethylene was continuously supplied so that the total pressure might be kept at 9.5 $kg/cm^2G$. The polymerization was carried out for one hour to obtain a polymer of 70 g. The polymerization activity was 365 kg/g·Ti/Hr and the MFR (the molten fluidity at 190° C. under load of 2.16 kg; JIS K 7210) of the obtained polymer was 40.

(3) Reaction of Titanium-containing Catalyst Ingredient with Fillers and Polymerization of Ethylene Hexane, which had been dehydrated at room temperature, of 500 ml and sintered ferrite powders F-200 (having a mean particle diameter of 70 μm manufactured by Powder Tech K. K.), which had been dried for 3 hours at 200° C. under vacuum (2 mmHg), of 450 g were put in an autoclave having the capacity of 1 l purged with argon and the stirring was started. Then, the temperature was increased to 40° C. and 0.02 mmol as titanium atoms of the titanium-containing polymerization catalyst ingredient obtained according to (1)

above mentioned was added and the resulting mixture was subjected to a reaction about 1 hour. Subsequently, triethyl aluminum of 2.0 mmol and diethyl aluminum chloride of 2.0 mmol were added and the resulting mixture was heated to 90° C. In this time, a pressure within a system amounted to 1.5 kg/cm$^2$G. Then, hydrogen was supplied to increase the pressure until 2 kg/cm$^2$G followed by conducting the polymerization for 40 minutes with continuously supplying ethylene so that the total pressure might be kept at 6 kg/cm$^2$G to obtain a ferrite-containing polyethylene composition of 473 g in all. The composition was dried for 1 hour at the roomtemperature under vacuum (2 mmHg) to obtain dried powders. The dried powders exhibited a uniform grayish white color and it was found by the electron microscopic observation that a surface of ferrite was thinly coated with polyethylene and no aggregation of ferrite particles among themselves was observed.

The obtained polyethylene composition was classified by means of a sieve of 106 $\mu$m in sieve opening to remove the particles of 106 $\mu$m or more.

The carrier obtained in this stage is referred to as Carrier $A_1$. Carrier $A_1$ had specific surface area $S_0$ of 0.62 m$^2$/g, bulk specific gravity $h_0$ of 1.73 g/cm$^3$. The specific surface area was measured by Flow Sorb 2300 (made by Shimazu Seisakusho K. K.) and was determined on the basis of BET method by measuring nitrogen adsorption. The measurement of bulk specific gravity was based on JIS Z 2504.

Then, the Carrier $A_1$ was put into hot air current set at 100° C. The Carrier $A_1$ was surface-treated for 2 hours. The resultant was classified by means of a sieve of 106 $\mu$m to remove the aggregate. The obtained carrier is referred to as Carrier $A_2$. It was found that by the electron microscopic observation that no aggregation of the carriers was observed. Carrier $A_2$ had the specific surface area $S_1$ of 0.39 m$^2$/g and the bulk specific gravity h of 2.04, which were measured in the same method as described above.

In addition, this composition was measured by means of TGA (thermal balance) with the result that ferrite was contained in a quantity of 95.2 wt %.

PRODUCTION EXAMPLE 2 OF CARRIER

Ferrite of 450 g and the titanium-containing catalyst ingredient, which had been prepared in a manner similar to (1) of PRODUCTION EXAMPLE 1, of 0.02 mmol as titanium atoms were put in an autoclave having the capacity of 1 l purged with argon and the resulting mixture was subjected to a reaction for one hour in the same manner as (3) of PRODUCTION EXAMPLE 1. Subsequently, carbon black (Ketchen black DJ-600; manufactured by Lion Akuzo K. K.) of 0.47 g was added to the reaction mixture through an upper nozzle of the autoclave. Carbon black, which had been dried for one hour at 200° C. under vacuum and turned into a slurry by the use of dehydrated hexane, was used. Subsequently, triethyl aluminum of 2.0 mmol and diethyl aluminum chloride of 2.0 mmol were added to the reaction mixture and the resulting mixture was heated to 90° C. In this time, a pressure within a system amounted to 1.5 kg/cm$^2$G. Then hydrogen was supplied to increase the pressure until 2 kg/cm$^2$G followed by conducting the polymerization for 45 minutes with continuously supplying ethylene so that the total pressure might be kept at 6 kg/cm$^2$G to obtain a ferrite and carbon black-containing polyethylene composition of 469.3 g in all. The composition was dried for 1 hour at the room temperature under vacuum (2 mmHg) to obtain dried powders. The dried powders exhibited a uniform black color and it was observed by an electron microscope that a surface of ferrite was thinly coated with polyethylene and carbon black was uniformly dispersed in polyethylene. In addition, this composition was analyzed by TGA (thermal balance) with the results that ferrite was contained in a quantity of 95.9 wt % and a ratio by weight of ferrite, polyethylene and carbon black was 24:1:0.025 as calculated from charged quantities.

The obtained polyethylene composition was classified by means of a sieve of 106 $\mu$m in sieve opening to remove the particles of 106 $\mu$m or more.

The carrier obtained in this stage is referred to as Carrier $B_1$. Carrier $B_1$ had specific surface area $S_0$ of 0.75 m$^2$/g, bulk specific gravity $h_0$ of 1.87 g/cm$^3$.

The obtained carrier was surface-treated in a manner similar to Production Example 1 except that the temperature was set at 120° C. and the treatment time was 2.5 hours.

The resultant Carrier was classified by means of a sieve of 106 $\mu$m to remove the aggregate. The obtained carrier is referred to as Carrier $B_2$. It was found by the electron microscopic observation that no aggregation of the carriers was observed. Carrier $B_2$ had the specific surface area $S_1$ of 0.45 m$^2$/g and the bulk specific gravity h of 2.24 g/cm$^3$.

PRODUCTION EXAMPLES 3-5 OF CARRIERS

Carriers were prepared and surface-treated in a manner similar to Production Example 2 of Carrier. The used additives and treatment time etc. were shown in Table 1.

The carriers which were not heat-treated are referred to as Carrier $C_1$ (Comparative Example 3), Carrier $D_1$ (Comparative Example 4) and Carrier $E_1$ (Comparative Example 5) respectively. The carriers which were heat-treated are referred to as Carrier $C_2$ (Example 3). Carrier $D_2$ (Example 4) and Carrier $E_2$ (example 5) respectively.

Figure 1:
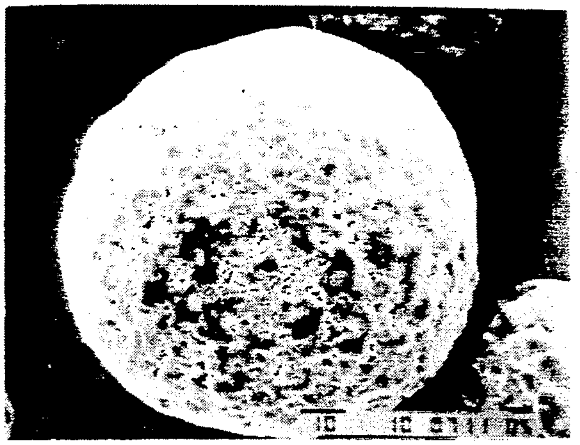
FIG. 1 shows a photograph showing a constitution of carrier particle coated with polyethylene-resin layer after heat treatment according to the present invention.

FIG. 1 and FIG. 2 are photographs (×1000) of Carrier $D_2$ and Carrier $D_1$ respectively, taken by means of a reflecting electron microscope.

The irregularities of coating layer of Carrier $D_2$ shown in FIG. 1 are made smoother than those of Carrier $D_1$ shown in FIG. 2, while the surface of Carrier $D_2$ has still irregularities.

PRODUCTION EXAMPLE 6 OF CARRIER

Ferrite of 450 g and the titanium-containing catalyst ingredient, which had been prepared according to (1) of PRODUCTION EXAMPLE 1, of 0.01 mmol as titanium atoms were put in an autoclave having the capacity of 1 l purged with argon and the resulting mixture was subjected to a reaction for 1 hour in the same manner as in PRODUCTION EXAMPLE 1. Then, carbon black (Ketchen black EC manufactured by Lion Akuzo K. K.) of 0.50 g was put in the autoclave through an upper nozzle of the autoclave. In addition, carbon black, which had been dried for 1 hour at 200° C. under vacuum and turned into a slurry by the use of dehydrated hexane, was used. Subsequently, triethyl aluminum of 1.0 mmol and diethyl aluminum chloride of 1.0 mmol were added to the resulting slurry and the resulting mixture was heated to 90° C. In this time, a pressure within a system amounted to 1.5 kg/cm$^2$G. Then, 1-butene of 37.5 mmol (2.1 g) was introduced and hydrogen was supplied to increase the pressure until 2 kg/cm$^2$G followed by conducting the polymerization for 28 minutes with continuously supplying ethylene so that the total pressure might be kept at 6 kg/cm$^2$G to obtain a ferrite and carbon black-containing polyethylenic composition of 467 g in all. The composition was dried for 1 hour at the room temperature under vacuum (2 mmHg) to obtain dried powders. The dried powders exhibited a uniform black color and it was observed by means of an electron microscope that a surface of ferrite was thinly coated with the polymer and carbon black was uniformly dispersed in the polymer. In addition, this composition was measured by means of TGA (thermal balance) with the result that a ratio by weight of ferrite, polymer and carbon black was 27:1:0.03. Furthermore, the polymer, from which ferrite and carbon, black had been removed, was obtained by the Soxhlet's extraction method (solvent: xylene) and subjected to the infrared absorption analysis with the confirmation that the obtained composition was a polyethylenic copolymer containing butene in a quantity of 8 wt %.

The obtained polyethylene composition was classified by means of a sieve of 106 μm to remove big particles of 106 μm or more. The obtained carrier is referred to as $F_1$.

Carrier $F_1$ was put into hot air current set at 120° C. The carrier was surface-treated for 2.5 hours. The resultant was classified by means of a sieve of 106 μm. The obtained carrier is referred to as Carrier $F_2$.

The specific surface area and the bulk specific gravity of Carriers $F_1$ and $F_2$ were shown in Table 1.

TABLE 1

| Production Example | Quantity of Core Material charged (g) | Additives kind | Additives charging quantity (g) | yield (g) | Filling ratio of ferrite (wt %) | Quantity of additives charged wt %/PE | True Specific Gravity of Carrier | Time of Surface Treatment temp./time | Specific Surface Area (m$^2$/g) | Bulk Specific Gravity (g/cm$^3$) | Carrier Name |
|---|---|---|---|---|---|---|---|---|---|---|---|
| 1 | 450 | — | — | 473.2 | 95.1 | — | 4.29 | — | 0.62 | 1.73 | $A_1$ |
| | | | | | | | | 100° C./2 hours | 0.39 | 2.04 | $A_2$ |
| 2 | 450 | Ketchen Black DJ-600 | 0.47 | 469.3 | 95.9 | 2.5 | 4.48 | — | 0.75 | 1.87 | $B_1$ |
| | | | | | | | | 120° C./2 hours | 0.45 | 2.24 | $B_2$ |
| 3 | 450 | Ketchen Black DJ-600 | 0.40 | 465.8 | 96.6 | 2.2 | 4.54 | — | 0.66 | 1.94 | $C_1$ |
| | | | | | | | | 120° C./2.5 hours | 0.43 | 2.33 | $C_2$ |
| 4 | 450 | Magnetite EPT-1000E | 2.15 | 474.1 | 94.9 | 10.0 | 4.34 | — | 0.78 | 1.90 | $D_1$ |
| | | | | | | | | 120° C./4 hours | | | |
| | | Ketchen Black DJ-600 | 0.43 | | | 2.0 | | | 0.57 | 2.47 | $D_2$ |
| 5 | 450 | Ketchen Black EC | 0.36 | 462.4 | 97.3 | 3.0 | 4.67 | — | 0.57 | 1.86 | $E_1$ |
| | | | | | | | | 120° C./0.5 hours | 0.51 | 2.08 | $E_2$ |
| 6 | 450 | Ketchen Black EC | 0.50 | 467.0 | 96.3 | 3.0 | 4.49 | — | 0.72 | 1.88 | $F_1$ |
| | | | | | | | | 120° C./2.5 hours | 0.48 | 2.26 | $F_2$ |

PRODUCTION EXAMPLE 1 OF TONER [(−) CHARGEABLE TONER (TONER A)]

| Ingredient | Parts by weight |
|---|---|
| Polyester resin (softening point: 130° C.; glass transition point: 60° C.; AV: 25; OHV: 38) | 100 |
| Carbon black (MA#8 manufactured by Mitsubishi Kasei K.K.) | 5 |
| Dyestuff (chromium complex) (Spilon Black TRH manufactured by Hodogaya Kagaku Kogyo K.K.) | 3 |

The above described materials were sufficiently mixed in a ball mill and then kneaded by the use of a three-roll mill heated at 140° C. The kneaded product was left as it was to be cooled and roughly pulverized in a feather mill followed by finely pulverizing in a jet mill. Subsequently, the resulting fine particles were pneumatically classified to obtain fine particles having a mean particle size of 13 μm (toner A).

PRODUCTION EXAMPLE 2 OF TONER [(+) CHARGEABLE TONER (TONER B)]

Toner B was produced from the following materials in the same manner as in PRODUCTION EXAMPLE 1.

| Ingredient | Parts by weight |
|---|---|
| Styrene-n-butyl methacrylate resin (softening point: 132° C.; glass transition point: 60° C.) | 100 |
| Carbon black (MA#8, manufactured by (Mitsubishi Kasei K.K.) | 5 |
| Nigrosine dyestuff (Bontron N-01 manufactured by Orient Kagaku K.K.) | 3 |

EXAMPLE 1

Carrier $A_2$ was mixed with Toner A to prepare a developer containing toner particles at the content of 7 wt %. The filling coefficient of this developer was 32%. The filling coefficient was determined according to Japanese Patent Laid-Open Sho 63-208867. This filling coefficient is higher than that of Carrier $A_1$ in Comparative Example 1 described later. The higher filling coefficient means that high density of copied images can be obtained even though the toner content is lower.

Then, the toner content was adjusted to 5 wt % to evaluate the density of copied images by a page printer equipped with a negatively-chargeable organic photosensitive member of laminated type. The density of copied images was 1.38. The value means that there is no practical problem.

The measurement of density of copied images was carried out by Sakura Reflective Densitometer (made by Konica K. K.)

EXAMPLES 2-5

Carrier $B_2$-Carrier $E_2$ prepared in Production Examples 2-5 of Carriers were used to evaluate the filling coefficients and the density of copied images in a manner similar to Example 1. The results of the evaluation were shown in Table 2.

However, Toner B was used in Examples 4 and 5. The copied images were evaluated by PPC (EP-4300; made by Minolta Camera K.K.) equipped with a negatively chargeable organic photosensitive member of a laminated type.

EXAMPLE 6

Carrier $F_2$ prepared in Production Example 6 of Carrier was used to evaluate the filling coefficient of the developer and the density of copied images in a manner similar to Example 1. The results of the evaluation were shown in Table 2.

TABLE 2

| Example | Carrier | Toner | Filling Coefficient of Developer containing Toner at the content of 7 wt % * | Density of copied images at Toner content of 5 wt % | note |
|---|---|---|---|---|---|
| 1 | $A_2$ | A | 32% | 1.38 | Page Printer was used |
| 2 | $B_2$ | A | 38% | 1.48 | Page Printer was used |
| 3 | $C_2$ | A | 38% | 1.47 | Page Printer was used |
| 4 | $D_2$ | B | 36% | 1.43 | PPC was used |
| 5 | $E_2$ | B | 35% | 1.44 | PPC was used |
| 6 | $F_2$ | A | 39% | 1.48 | Page Printer was used |

* : value calculated on the basis of 0.45 mm in gap for regulating level of developer and 0.55 mm in developing gap

COMPARATIVE EXAMPLE 1

Carrier $A_1$ was mixed with Toner A for evaluation in a manner similar to Example 1.

When the toner content was 7 wt %, the filling coefficient of developer was 23%.

The developer composed of Carrier $A_1$ and Toner A provided adequate density of copied images when the toner content was high. However, when the toner content was low (5 wt %), the density of copied images formed by a printer became low (1.01).

COMPARATIVE EXAMPLES 2-5

Carriers $B_1$-$E_1$ prepared before heat treatment in Production Examples 2-5 of Carriers were used to prepare developers. The filling coefficients of the developers and the density of copied images were evaluated in a manner similar to Example 1. The results of the evaluation were shown in Table 3.

However, Toner B was used in Comparative Examples 4 and 5 and the copied images were evaluated by a copying machine PPC (EP-4300; made by Minolta Camera K.K.) equipped with negatively chargeable organic photosensitive member.

COMPARATIVE EXAMPLE 6

Carrier $F_1$ prepared in Production Example 6 of Carrier was used to prepare a developer. The filling coefficient of the developer and the density of copied images were evaluated in a manner similar to Example 1. The results of the evaluation were shown in Table 3.

TABLE 3

| Comparative Example | Carrier | Toner | Filling Coefficient of Developer containing Toner at the content of 7 wt % * | Density of copied images at Toner content of 5 wt % | note |
|---|---|---|---|---|---|
| 1 | $A_1$ | A | 23% | 1.01 | Page Printer was used |
| 2 | $B_1$ | A | 28% | 1.20 | Page Printer was used |
| 3 | $C_1$ | A | 27% | 1.21 | Page Printer was used |
| 4 | $D_1$ | B | 26% | 1.17 | PPC was used |
| 5 | $E_1$ | B | 27% | 1.22 | PPC was used |
| 6 | $F_1$ | A | 28% | 1.20 | Page Printer was used |

* : value calculated on the basis of 0.45 mm in gap for regulating level of developer and 0.55 mm in developing gap

What is claimed is:

1. A carrier of a two component developer for developing electrostatic latent images comprising:
   a carrier core material comprising a magnetic particle, and
   a surface-coating layer formed on the core material having a coated area of about 70% or more by polymerizing an olefinic monomer on the surface of the core material so that the polyolefin has a weight average molecular weight of $5.0\times10^3$-$5.0\times10^5$ and then heat treating, wherein the carrier has a specific surface area of from 0.14-0.81 $m^2/g$, a true specific gravity of 3.5-7.5, a filling ratio of about 90% or more and an electrical resistance of $1\times10^6$-$1\times10^{14}$ ohm.cm.

2. The carrier of claim 1, in which the surface coating layer has irregularities on the air side.

3. The carrier of claim 1, in which the carrier core material has 20-100 $\mu m$ in mean particle size.

4. The carrier of claim 1, in which the olefinic monomer is ethylene.

5. The carrier of claim 1, in which the surface coating layer further comprises at least one of fine particles having a charge controlling function and electrically conductive fine particles as an additive.

6. The carrier of claim 5, in which the additive is 0.01-2.0 $\mu m$ in mean particle size.

7. The carrier of claim 5, in which the additive is contained at a content of 0.1-60 wt % on the basis of the polyolefin.

8. A carrier of a two component developer for developing electrostatic latent images comprising:
   a carrier core material comprising a magnetic particle, and
   a surface-coating layer formed by treating the carrier core material with a catalyst component to polymerize an olefinic monomer for forming irregularities from portions where the catalyst component exists so that the polyolefin has a weight average molecular weight of $5.0\times10^3$-$5.0\times10^5$ and then heat treating, wherein the carrier has a specific surface area of from 0.14-0.18 $m^2/g$, a true specific gravity of 3.5-7.5, a coated area of about 70% or more, a filling ratio of about 90% or more and an electrical resistance of $1\times10^6$-$1\times10^{14}$ ohm.cm.

9. The carrier of claim 8, in which the carrier core material has 20–100 μm in mean particle size.

10. The carrier of claim 8, in which the olefinic monomer is ethylene.

11. The carrier of claim 8, having a bulk specific gravity of 1.87–2.60 $g/cm^3$.

12. The carrier of claim 8, in which the surface coating layer further comprises at least one of fine particles having a charge controlling function and electrically conductive fine particles as an additive.

13. The carrier of claim 12, in which the additive is 0.01–2.0 μm in mean particle size.

14. The carrier of claim 12, in which the additive is contained at a content of 0.1–60 wt % on the basis of the polyolefin.

15. The carrier of claim 8, in which the catalyst component comprises at least one of titanium and zirconium.

16. A carrier of a two component developer for developing electrostatic latent images comprising;

a carrier core material comprising a magnetic particle, and a surface-coating layer formed on the carrier core material having a coated area of about 70% or more by polymerizing an olefinic monomer on the surface of the carrier core material so that the polyolefin has a weight average molecular weight of $5.0\times10^3$–$5.0\times10^5$ and then heat treating, wherein the carrier has a bulk specific gravity of 1.87–2.60 $g/cm^3$ and a specific surface area of 0.14–0.81 $m^2/g$, a true specific gravity of 3.5–7.5, a filling ratio of about 90% or more and an electrical resistance of $1\times10^6$–$1\times10^{14}$ ohm.cm.

17. The carrier of claim 16, having a bulk specific gravity of 2.03–2.56 $g/cm^3$.

18. The carrier of claim 16, having a specific surface area of 0.16–0.72 $m^2/g$.

19. The carrier of claim 16, in which the surface coating layer has irregularities on the air side.

20. The carrier of claim 16, in which the carrier core material has 20–100 μm in mean particle size.

21. The carrier of claim 16, in which the olefinic monomer is ethylene.

22. The carrier of claim 16, in which the surface coating layer further comprises at least one of fine particles having a charge controlling function and electrically conductive fine particles as an additive.

* * * * *